United States Patent
Timko et al.

(10) Patent No.: US 6,704,759 B2
(45) Date of Patent: Mar. 9, 2004

(54) METHOD AND APPARATUS FOR COMPRESSION/DECOMPRESSION AND FILTERING OF A SIGNAL

(75) Inventors: Mark Timko, Burr Ridge, IL (US); Eric S. Collins, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 588 days.

(21) Appl. No.: 09/766,042

(22) Filed: Jan. 19, 2001

(65) Prior Publication Data

US 2002/0099747 A1 Jul. 25, 2002

(51) Int. Cl.[7] ............................................. G06F 17/14
(52) U.S. Cl. ....................................... 708/402; 708/319
(58) Field of Search ................................. 708/402, 319

(56) References Cited

U.S. PATENT DOCUMENTS

| | | | | |
|---|---|---|---|---|
| 5,181,183 A | * | 1/1993 | Miyazaki | 708/402 |
| 5,339,265 A | * | 8/1994 | Liu et al. | 708/400 |
| 5,452,466 A | * | 9/1995 | Fettweis | 712/36 |
| 5,477,478 A | * | 12/1995 | Okamoto et al. | 708/402 |
| 5,500,811 A | * | 3/1996 | Corry | 708/319 |
| 6,184,935 B1 | * | 2/2001 | Iaquinto et al. | 348/441 |
| 6,282,555 B1 | * | 8/2001 | Ohara | 708/401 |
| 6,574,648 B1 | * | 6/2003 | Oohashi et al. | 708/402 |

OTHER PUBLICATIONS

S.I. Uramoto, et al.; "A 100–Mhz 2–D Discrete Cosine Transform Core Processor, " IEEE Journal of Solid–State Circuits, vol. 27 (4), Apr. 1992, pp. 492–499.

* cited by examiner

Primary Examiner—David H. Malzahn
(74) Attorney, Agent, or Firm—Kenneth A. Haas

(57) ABSTRACT

A method and apparatus for compression/decompression and filtering of a signal in which the apparatus has an input register (704) which receives the received signal, an output register (712) which transmits a processed signal and a distributed arithmetic processor (708) having a plurality of operational modes. The distributed arithmetic processor is coupled to the input register by an input path and is coupled to the output register by an output path. The apparatus also has a DCT butterfly processor (706) selectively switched into the input path in response to selection of a predetermined operational mode from the plurality of operational modes. An IDCT butterfly processor (710) is also selectively switched into the output path in response to the selection of one of the predetermined operational modes. Additionally, the apparatus selectively functions as a FIR filter with both the DCT butterfly processor (706) and IDCT butterfly processor (710) removed from the input and output paths.

19 Claims, 7 Drawing Sheets

METHOD AND APPARATUS FOR COMPRESSION/DECOMPRESSION AND FILTERING OF A SIGNAL

FIELD OF THE INVENTION

The present invention relates generally to signal processing and, specifically to, digital signal compression and decompression.

BACKGROUND OF THE INVENTION

Current video and still image compression and decompression schemes contain separate functional blocks for pre-processing, post-processing, inverse/forward discrete cosine transformation (IDCT/DCT) and finite impulse response (FIR) filtering. The separate blocks are currently used in such devices as high definition television and video conference devices. The data path size for the IDCT/DCT and the FIR filter is dictated by the type of application. Applications that may use low quality images, such as video conferencing can operate with smaller data paths. Applications such as HDTV require wider data paths and results in a clear and more dense picture.

An IDCT/DCT block design using distributed arithmetic is described in an Institute of Electrical and Electronics Engineers (IEEE) paper by S. I. Uramoto, et al., "A 100-Mhz 2-D Discrete Cosine Transform Core Processor," IEEE Journal of Solid-State Circuits, vol. 27(4), April 1992, pp.492–499. The Uramoto paper described a DCT/IDCT distributed arithmetic processor (DAP) as a processing unit connected to a transpose random access memory (RAM), with the transpose RAM connected to other DCT/IDCT processing units. The DCT/IDCT DAP accomplished the DCT/IDCT transforms via multiply accumulator operations.

Disadvantageously, when signal compression and decompression is applied to a signal via a DCT/IDCT DAP, an additional filter (usually a FIR filter) is required. The additional FIR filter results in an increase in the total component cost of an apparatus. The production cost associated with the additional hardware is also increased because of the additional assembly tasks required for inserting and configuring the FIR filter. Accordingly, there is a need in the art for a method and apparatus for reducing production and component costs of signal compression and decompression circuits.

DETAILED DESCRIPTION OF THE PREFERRED EMBODIMENTS

To overcome the problems of having a separate filter device used with a DCT/IDCT device, a single device with a common data path capable of selectively being configured as a DCT/IDCT/FIR filter is desirable. Furthermore, a single DCT/IDCT/FIR filter device eliminates the need and expense of having a separate FIR filter and DCT/IDCT device in a circuit.

The present invention encompasses a method of compression and decompression of an input signal in a digital device. The digital device receives the input signal and a control signal at a processor engine. The processor engine is configurable as a DCT/IDT/FIR filter and has a pre-processor, a post-processor, and a distributed arithmetic processor and controlled by a controller or microsequencer. The pre-processing of the input signal results in a pre-processed signal upon receipt of the input signal at the DCT/IDT/FIR filter. The pre-processed signal is processed by the processor engine into a post-processed signal that is transmitted from the processor engine. The present invention additionally encompasses a method of storing the pre-computed coefficients for the DCT, IDCT, and FIR operations that are used in the ROM/RAM accumulators. The fixed DCT and IDCT coefficients are stored in a single dual-plane, dual port ROM or two separate dual port ROMs. The FIR filter coefficients are stored in a dual port RAM and are loaded by the microsequencer before processing begins. The FIR coefficients will change depending on the filter selected (3-tap, 5-tap, etc.).

Figure 1:
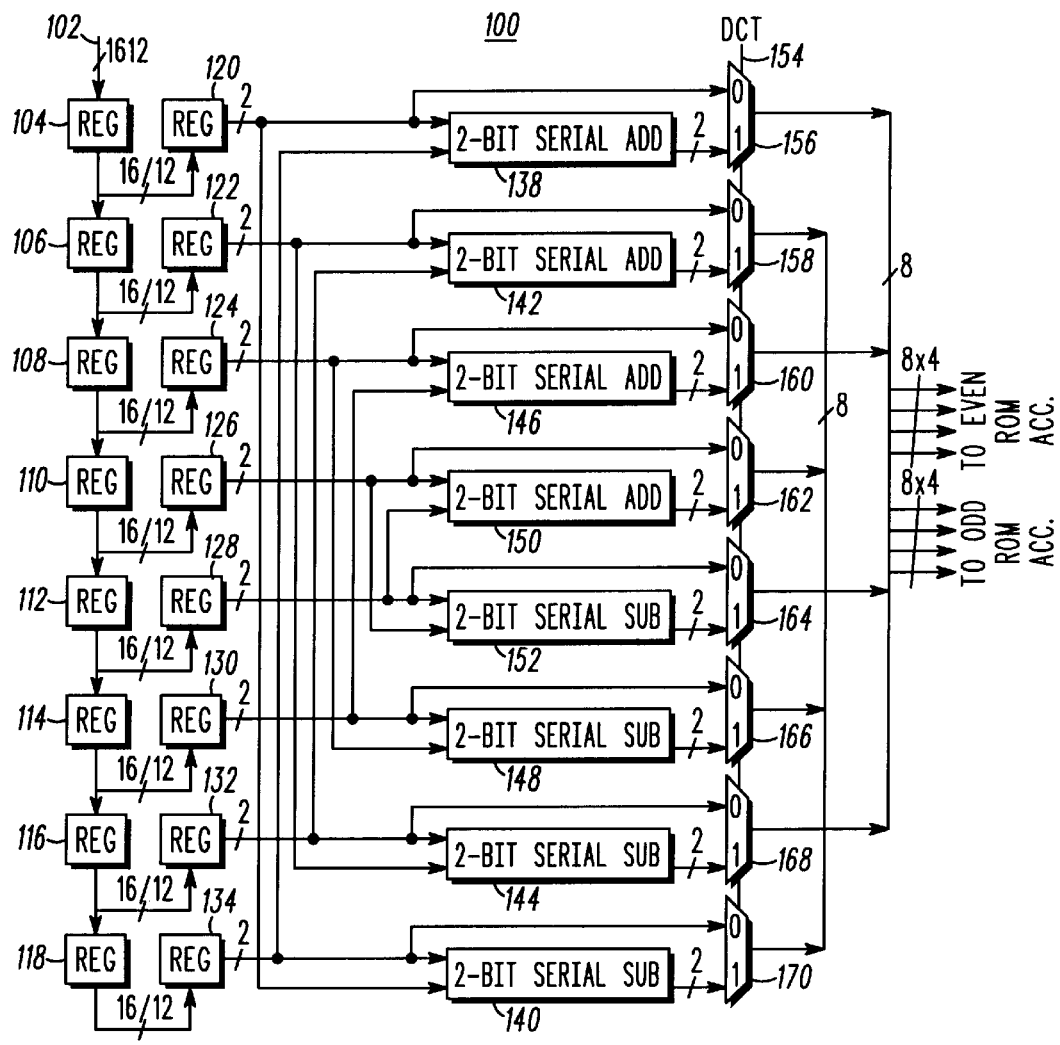
FIG. 1 is a block diagram of a DCT/IDCT pre-processor.

In FIG. 1, a block diagram of a DCT/IDCT pre-processor is shown. The pre-processor 100 receives a digital input signal on a data bus 102. The registers 104–108 are serially coupled together and the digital input signal is received serially at each of the registers 104–118. A second set of buffers 120–136 is interspersed between the first set of buffers 104–118 and receive the digital signal once the first set of buffers 104–118 are loaded. The output of register 122 is coupled to two 2-bit serial adders 138 and 140. The output of register 122 is coupled to two 2-bit serial adders 142 and 144. The output of register 124 is coupled to two 2-bit serial adders 146 and 148. The output of register 126 is coupled to two 2-bit serial adders 150 and 152. The output of register 128 is also coupled to the two 2-bit serial adders 150 and 152. The output of register 130 is also coupled to the two 2-bit serial adders 146 and 148. The output of register 136 is also coupled to the two 2-bit serial adders 138 and 140. A DCT control line 154 selects between the output of each of the serial adders 138–140 and the input from the registers 120–136 using a plurality of multiplexers 156–170.

The pre-processor 100 has a double buffer configuration to handle the incoming serial data. The first eight values are loaded into the registers 104–118 in eight clocks cycles. During the last load, all eight values are parallel loaded into the second stage registers 120–136. Over the next eight clock cycles while the first stage registers 104–118 are being re-loaded, the second stage registers 120–136 will shift out the two LSBs (Least Significant Bits) each cycle until all sixteen bits have been processed. In the case of an IDCT operational mode, the 2-bit serial add 138–152 are bypassed and the values are grouped as in the DCT case. In alternate embodiments the input data size can be other sizes, such as twelve bits, upon modification of the pre-processor to take advantage of the smaller input data size width.

Figure 2:
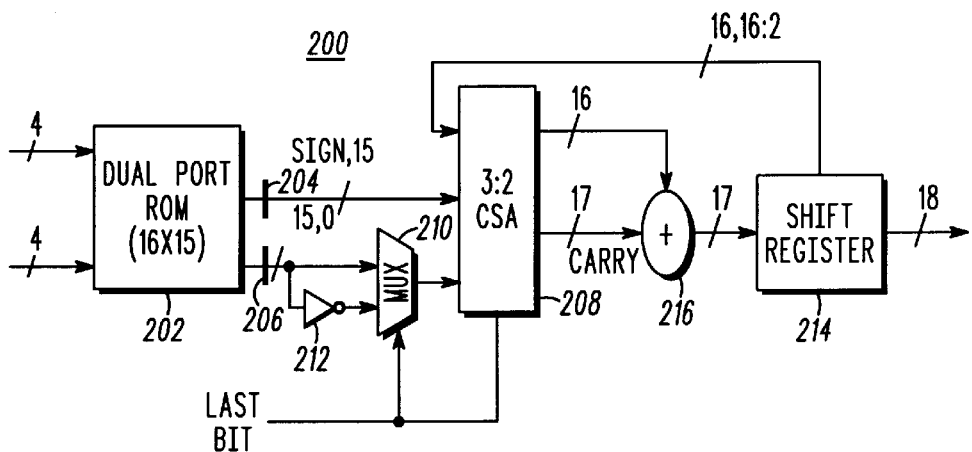
FIG. 2 is a block diagram of a read only memory (ROM) accumulator.

Turning to FIG. 2, a block diagram of a ROM accumulator 200 is shown. A dual port ROM 202 having two outputs is coupled to two pipeline registers 204 and 206 respectively. The pipeline register 204 is coupled to the input of a carry save adder (CSA) 208. The other pipeline register 206 is coupled to a first input on a multiplexer 210 and an inverter 212. The inverter 212 is coupled to a second input of the multiplexer 210. The CSA 208 has inputs from the pipeline register 204, the multiplexer 210, and a shift register 214. The CSA 208 has two outputs representing the sum and carry bits coupled to an adder 216. The output of the adder 216 is coupled to the shift register 214. The multiplexer 210 and CSA 208 also have a respective input for a last bit or carry bit ($C_{in}$).

The two outputs of the dual port ROM 202, with the upper bit value shifted left one bit by the pipeline register 206, are added to the sign extended fifteen MSBs (sign extended to 16 bits) of the shift register 214. The result of the sixteen-bit adder is stored back into the shift register 214 and then shifted right by two bits for the next cycle. This continues for the eight two bit pairs with a slight modification for the last bit in the last pair. The last bit is transferred as $C_{in}$ to the CSA 208 and also activates the mux 210 that accepts the inverted value of the last bit from inverter 212. This final value is subtracted instead of added (because of the inverted $C_{in}$ value) when it is combined with the value for the fifteenth bit and the output of the CSA 208. The combination of a final sixteen bit result of the second adder 216 and 16 shifts will generate a thirty-two bit result. To maintain the necessary accuracy, the last sixteen bit result (the upper bit is dropped) and the last shift two out values are saved and passed on to the post processing block for a total of eighteen bits being sent from the shift register 214.

Figure 3:
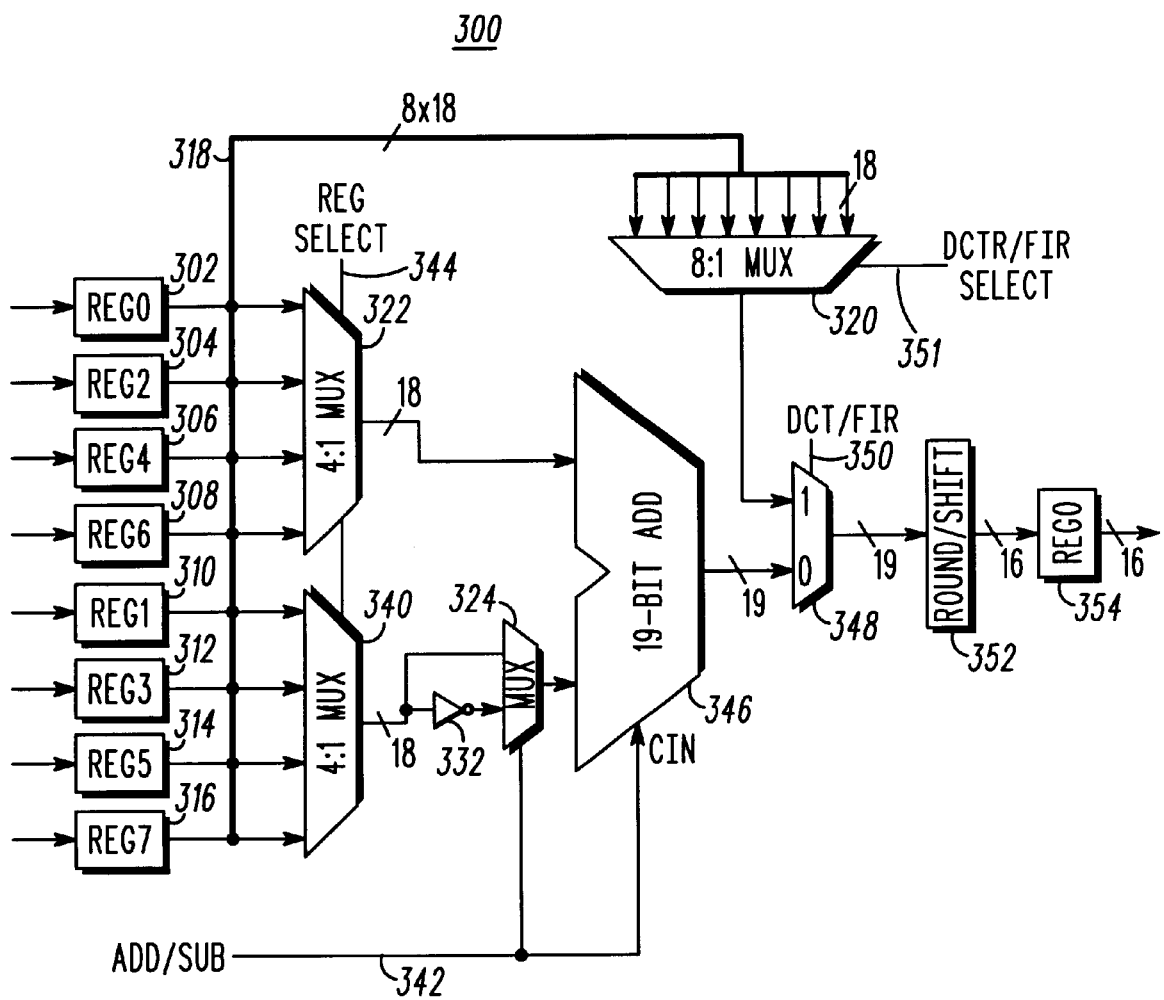
FIG. 3 is a block diagram of a post-processor in accordance with an embodiment of the invention.

In FIG. 3, a block diagram of a post-processor in accordance with an embodiment of the invention is shown. Eight Rom/Ram accumulators (described in FIG. 5) are coupled to the input of eight registers 302–316, FIG. 3. Each of the eight registers 302–316 are coupled to a bus 318 that is coupled to a 8:1 multiplexer 320, a 4:1 multiplexer 322 and 4:1 multiplexer. The output of multiplexer 340 is coupled to a first input of multiplexer 324 and an inverter 332. The output of the inverter is coupled to the second input of multiplexer 324. The output of multiplexer 324 is coupled to the input of a 19-bit adder 346. The output of the 19-bit adder 346 and the 8:1 multiplexer 320 are coupled to a fourth multiplexer 348 having a connection to the DCT/FIR control line 350. The output of the fourth multiplexer 348 is coupled to a round/shift register 352. The round/shift register 352 is coupled to an output register 354.

The eight input values are loaded into the eight input registers 302–316 of the post-processor. Over the next eight cycles, the four adds and four subtracts are performed to generate the eight output values. The 19-bit adder 346 is fed by the two 4:1 multiplexers 322, 340 with the subtraction multiplexer 324 on the output of the odd multiplexer 340. The 4:1 multiplexers 322, 340 are only used in the IDCT mode.

The 19-bit adder in the post-processor receives inputs from the two 4:1 multiplexer 322 and 340 with a subtraction multiplexer 324 connected to the output of the 4:1 multiplexer 340. The subtraction multiplexer 324 has two inputs originating at the 4:1 multiplexer 340. The first is a normal input and the second is an inverted input via inverter 332.

In order to generate the IDCT coefficients in the correct order (0–7), the 2-bit multiplexer control (register select signal 344) simply counts up (00, 01, 10, 11) while the subtraction mux 324 is "off" to generate the first four outputs. The 2-bit multiplexer control then counts back down (11, 10, 01, 00) while the subtraction muxes are "on" to generate the last four outputs. This assumes that register 302 and register 310 are connected to the "00" input, register 304 and register 312 are connected to the "01" input, register 306 and register 314 are connected to the "10" input, register 308 and register 316 are connected to the "00" input of the 4:1 multiplexer 340.

The 8:1 multiplexer 320 for the DCT bypass is controlled by a three-bit input 351 that simply counts from 0 to 7 with the assumption that the inputs are connected in numerical order (as opposed to the even-odd order of the post-processor input registers). For the FIR bypass, the multiplexer 320 is controlled by a 0 to 4 counter on input 351 if both the 3 tap and 5 tap filters are used. If only one of the filters is used, the counter is modified to select the even (for 3 tap) or odd (for 5 tap) register.

The eighteen-bit output of the bypass multiplexer 320 is checked for overflow/underflow and then clamped down by the round/shift register 352 to sixteen, twelve or nine bits for the first pass DCT/IDCT, second pass DCT, or second pass IDCT respectively. The register 354 will hold each output for one cycle as it is loaded into the transpose RAM or the output buffer. The post-processor will always generate these values in order due to the sequencing of the inputs of the 19-bit adder 346.

Figure 4:
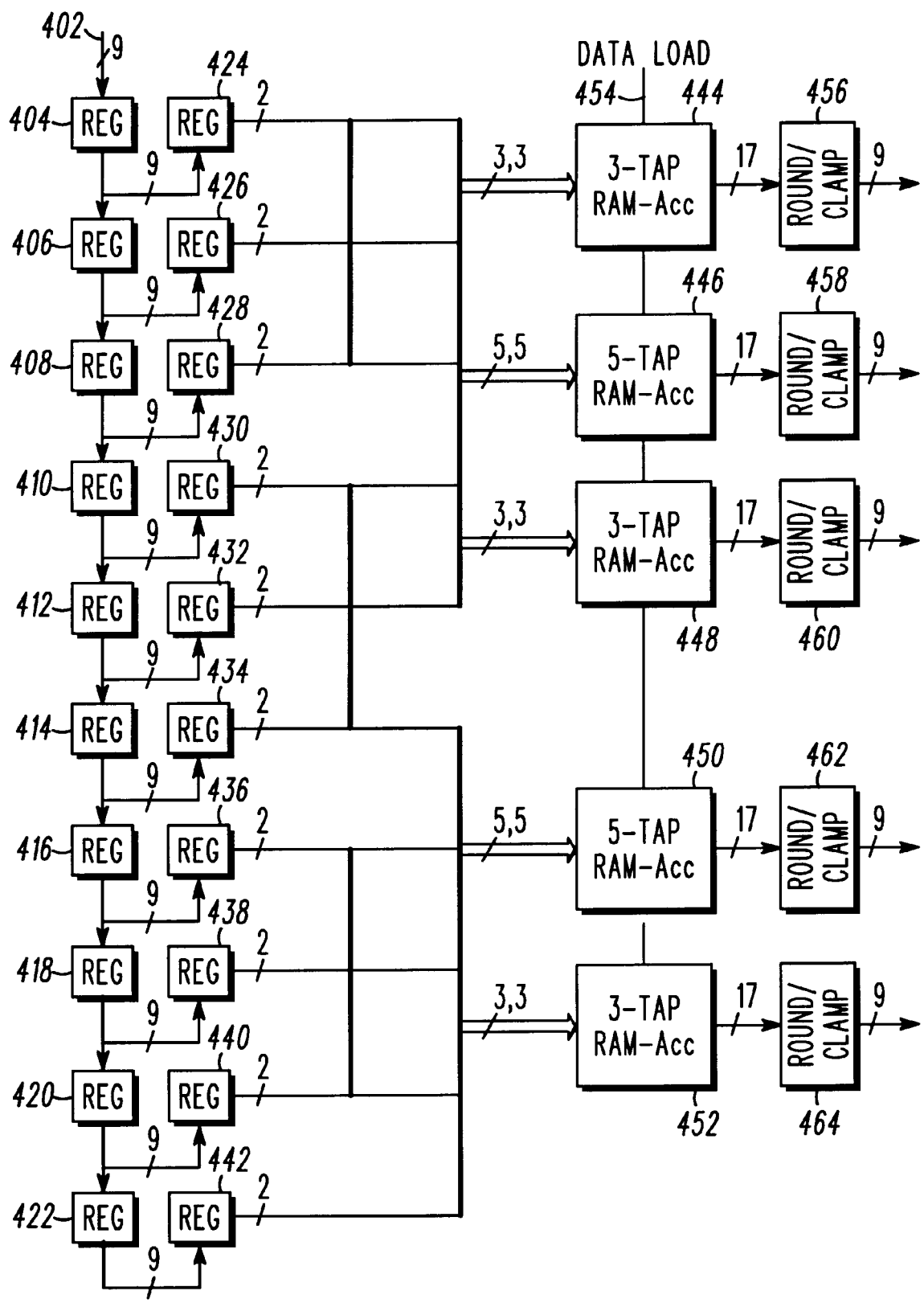
FIG. 4 is a block diagram of a DAP in a FIR filter mode having 3-tap and 5-tap FIR filters in accordance with an embodiment of the invention.

In FIG. 4, a block diagram of a DAP in a FIR filter mode having 3-tap and 5-tap FIR filters in accordance with an embodiment of the invention is shown. A digital input signal is received at the DAP via an input line 402. The registers 404–422 are serially coupled together and the digital input signal is received serially at each of the registers 404–422. A second set of registers 424–442 is interspersed between the first set of buffers 404–422 to receive the digital signal after the first set of buffers 404–422 is loaded with the digital signal data. The output of registers 424, 426, and 428 are coupled to a 3-tap RAM-accumulator 444. The output of registers 424–434 are coupled to a 5-tap RAM-accumulator 446. The output of registers 430, 432, and 434 are coupled to another 3-tap RAM-accumulator 448. The outputs of registers 434–442 are coupled to another 5-tap RAM-accumulator 450. The output of registers 436–440 are coupled to a third 3-tap RAM-accumulator 452. Each tap is coupled to a data load line 454 and has an output coupled to a respective round/clamp register 456–464.

To add FIR filter capabilities to the DCT/IDCT architecture while maximizing hardware reuse, it is noted that both the DCT/IDCT functions and the FIR filter function relay on a series of multiply-accumulate operations that are combined to generate a single output. The additional hardware needed to support the FIR filter function is a number of dual-port RAMs in some or all of the DCT accumulator blocks and additional connections from the pre-processor block to drive the address lines of the FIR filter RAMs.

The inclusion of the elements to support FIR filter operations is dual port RAMs (or single port RAM for processing one bit at a time) in some or all of the accumulators 444–452 of the distributed arithmetic DCT/IDCT block. Depending on the numbers and types of FIR filters that are required in a given implementation, some of the ROM accumulator will not need the addition of the dual port RAM.

The dual port RAM is loaded with the set of pre-computed filter coefficients for a given filter in the same way that the DCT/IDCT ROMs contain the pre-computed DCT/IDCT coefficients needed in the transform. When operating in FIR filter mode, the multiplexer in front of the 3:2 CSA logic will select the output of the dual port RAM, instead of the DCT/IDCT ROM. The bypass multiplexers in the pre-processing and post-processing blocks (needed for the IDCT and DCT functions respectively) are both deselected for FIR filter operation as no butterfly multiplication operations are required.

The address inputs to each RAM will be determined by the number and types of FIR filter operations needed for a given application. FIG. 4 shows the connections needed to support three 3-tap FIR filters and two 5-tap FIR filters in the present embodiment. Two additional input registers 420, 422, have been added to support the 10 inputs needed to compute two 5-tap filters. These registers are not used in either the DCT or IDCT mode of operation. The five RAM accumulators 444–452 (three 3-tap and two 5-tap) are implemented by adding RAM to the first five of eight ROM accumulators in the DCT/IDCT configuration. In the FIR filter mode, the outputs of the three 3-tap filters or the outputs of the two 5-tap filters would use the bypass function of the post-processor with the micro-sequencer controlling the order of the outputs.

The current embodiment has a throughput of three, 3-tap filter calculations 444, 448, 452 or two, 5-tap filter calculations 446, 450 in five clock cycles assuming the input registers were loadable in five clock cycles (either double the clock rate or load two values per clock with a larger input bus width).

Figure 5:
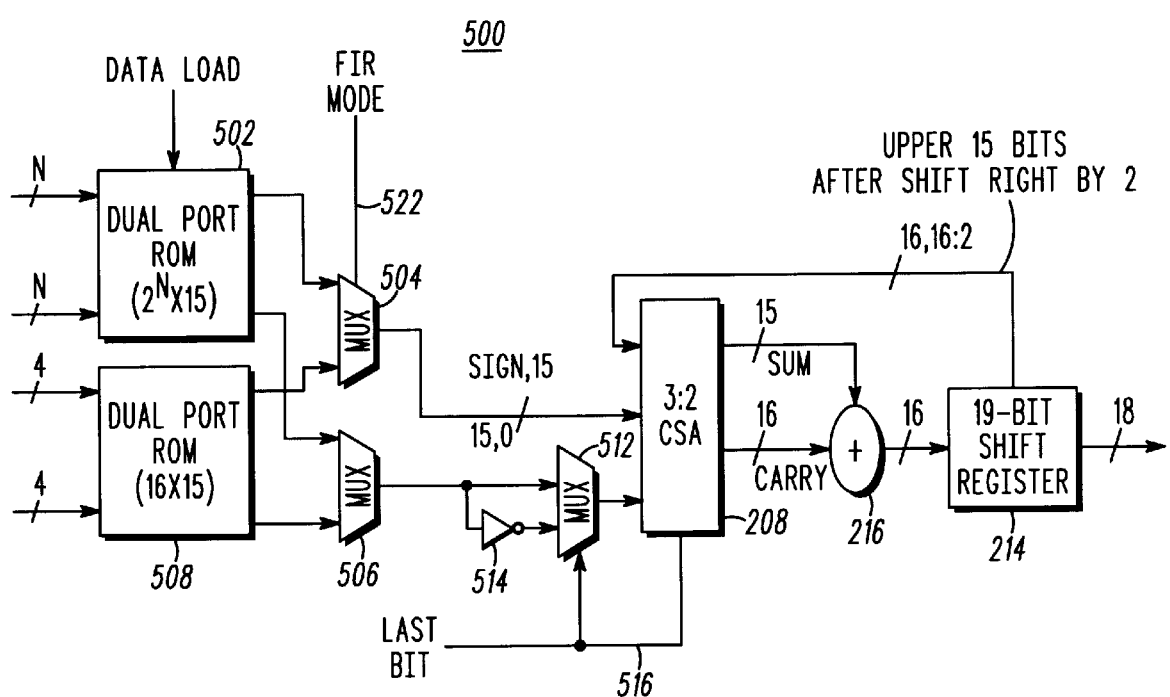
FIG. 5 is a ROM/RAM accumulator in accordance with an embodiment of the invention.

Turning to FIG. 5, a ROM/RAM accumulator in accordance with an embodiment of the invention is shown. The ROM/RAM accumulator 500 has a dual port RAM coupled 502 to two multiplexers 504 and 506. A dual port dual plane ROM 508 is also coupled to the two multiplexers 504 and 506. Additionally, the two multiplexers 504, 506, are coupled to a control line 522 that signals when the FIR filter mode is active. The multiplexer 504 has an output that is preferably hard wired to shift the data right by one bit and is coupled to the CSA 208. The other multiplexer 506 has an output that is coupled to a third multiplexer 512 and the output from multiplexer 506 is inverted by an inverter 514 and also coupled to the third multiplexer 512. The output of the third multiplexer 512 is coupled to the CSA 208. Both the CSA 208 and the third multiplexer 512 have a control line 516 for the last bit of the signal being processed. The output of the CSA 208 and carry bit are combined by an adder 216. The output of the adder 216 is coupled to a 19-bit shift register 214 and the upper 15 bits of the 19-bit shift register 214 is coupled to the CSA 208 with the upper 15 bits shifted right by two bits. Additionally, the shift register 214 provides an eighteen bit result from the ROM/RAM accumulator.

The flexibility of DCT/IDCT/FIR filter engine creates an almost endless number of alternate embodiments of FIR filter sizes that may be implemented depending on the needs of a given application. A programmable microsequencer controls the data path and allows the DCT, IDCT, and FIR filter functions to be executed on a common data path. The microsequencer drives the control line 522 of the input and output registers along with multiplexers 504 and 506 needed to support multiple functions on the same data path. The microsequencer is also responsible for controlling the loading of the FIR filter RAM 502. By allowing these RAM 502 to be reprogrammed, any n-tap FIR filter can be supported provided the processor is parameterized to support the specific number of taps used to calculate each output.

Figure 6:
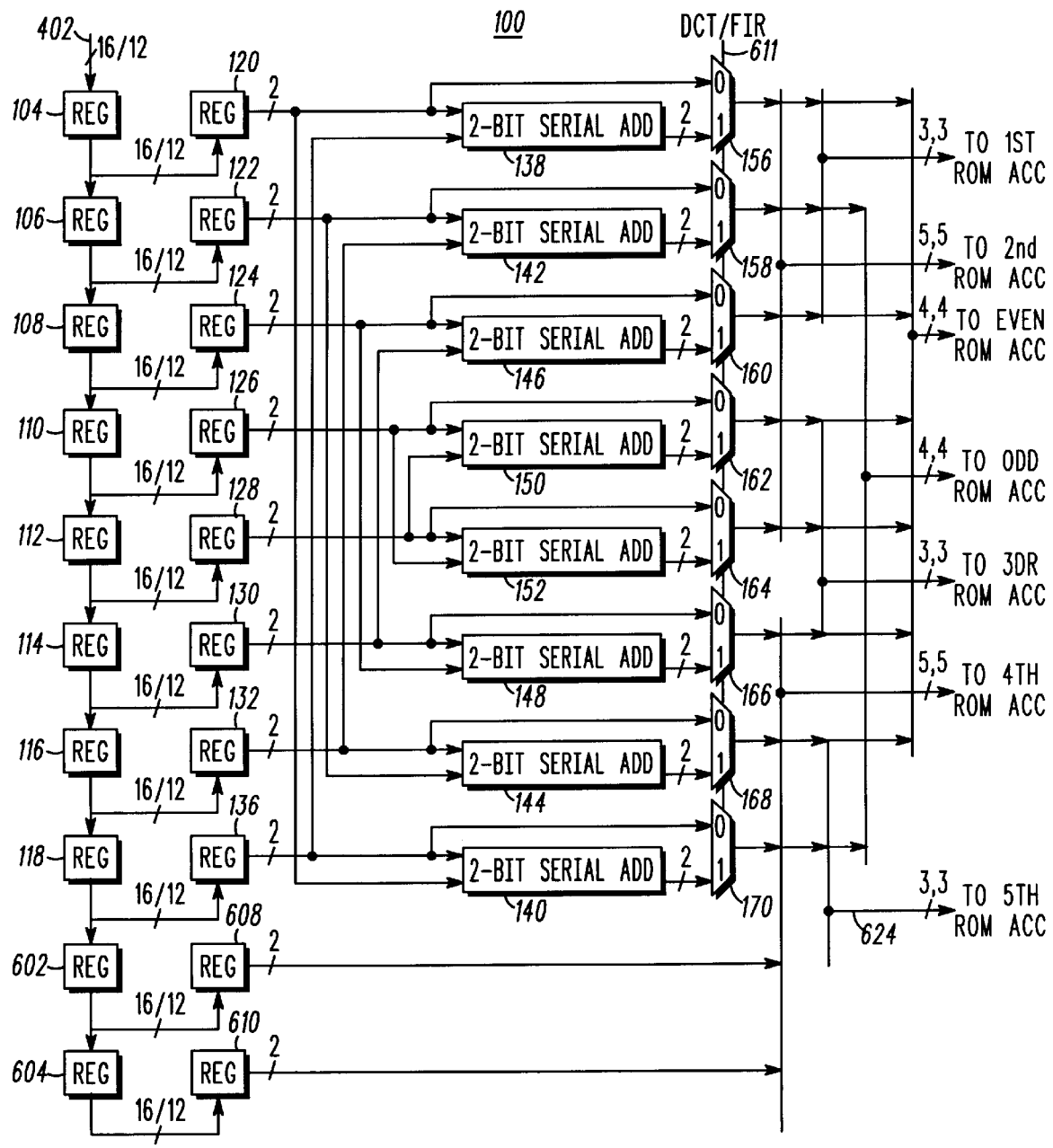
FIG. 6 is a DCT/IDCT/FIR pre-processor in accordance with an embodiment of the invention.

In FIG. 6, a block diagram of a DCT/IDCT/FIR pre-processor in accordance with an embodiment of the invention is shown. In addition to the components of the DCT/IDCT pre-processor of FIG. 1, a ninth shift register 602 and a tenth shift register 604 are coupled to register 118. Register 602 is also coupled to register 608 and register 604 is similarly coupled to register 610. Registers 608 and 610 are loaded after data is shifted through registers 104–118, 602 and 604. The DCT/FIR selection signal 611 from a microsequencer determines if the preprocessor is in a DCT or FIR filter mode of operation.

The mode of operation of the DCT/FIR pre-processor determines what outputs are active. If the DCT/FIR signal 611 is high, then the preprocessor is in DCT mode and output 616 to even ROM accumulator and output 618 to the odd ROM accumulator are active. If the DCT/FIR signal 611 is low, then the FIR outputs are active with output 612 being a FIR filter output going to the first ROM accumulator (3-tap). The next FIR output 614 is coupled to the second ROM accumulator (5-tap). A third FIR output 620 is coupled to the third ROM accumulator (3-tap). A fourth FIR output 622 is coupled to the fourth ROM accumulator (5-tap) and the fifth FIR output 624 is coupled to the fifth ROM accumulator (3-tap). Thus, a pre-processor with FIR filter support requires a few additional hardware blocks over what a normal DCT preprocessor would have.

Figure 7:
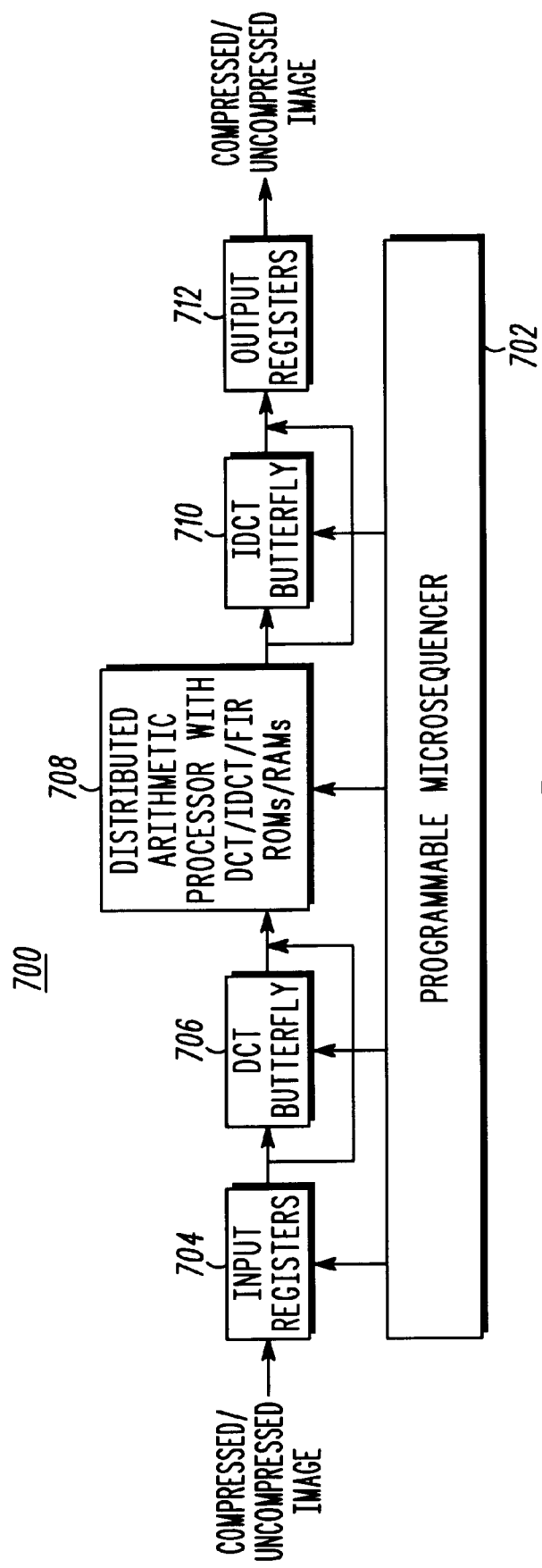
FIG. 7 is a block diagram of a programmable & parameterizable DCT/IDCT/FIR filter engine having a programmable microsequencer in accordance with an embodiment of the invention.

In FIG. 7, a block diagram of a programmable & parameterizable DCT/IDCT/FIR filter engine 700 having a programmable microsequencer is shown. A programmable microsequencer 702 coupled to an input register 704, a DCT butterfly processor 706, a DAP with DCT/IDCT/FIR ROMs & RAMs 708, an IDCT butterfly processor 710, and an output register 712. The signal output of the input register 704 is selectively coupled to the inputs of the DCT butterfly processor 706 (pre-processor) or the DAP 708. The output of the DCT butterfly processor 706 (pre-processor) is also coupled to the DAP 708. The DAP 708 is selectively coupled to the IDCT butterfly processor 710 (post-processor) or the output register 712. The output of the IDCT butterfly processor 710 (post-processor) is also coupled to the output register 712.

The DAP has three modes of operation (DCT, IDCT, and FIR filter) and a common data path selectable by the programmable microsequencer 702. When the programmable mircosequencer 702 selects the DCT mode of operation, the uncompressed signal is received at the input register 704. The DCT butterfly processor 706 (pre-processor) is selected by the programmable microsequencer 702 and the IDCT butterfly processor 710 (post-processor) is not selected. The uncompressed signal is processed by the DAP 708 configured in a DCT mode resulting in a compressed signal at the output register 712.

Another mode of operation for the DCT/IDCT/FIR filter engine 700 is the IDCT mode. In the IDCT mode of operation, the programmable microsequencer 702 selects the IDCT butterfly processor 710 (post-processor) to be coupled to the DAP 708 and the DCT butterfly processor 706 (pre-processor) to be unselected. A compressed signal is received at the input register 704. The signal is passed from the input register 704 to the DAP 708. The DAP 708 is configured by the programmable microsequencer 702 to function in an IDCT mode. The processed signal passes from the DAP 708 to the IDCT butterfly processor 710 for post-processing. The uncompressed signal is sent to the output register 712.

The third mode of operation for the DCT/IDCT/FIR filter engine 700 is as a FIR filter. The programmable microsequencer 702 deselects the DCT butterfly processor 706

(pre-processor) and the IDCT butterfly processor 710 (post-processor). The DAP 708 is configured in the FIR filter mode by the microsequencer 702 and the FIR mode control line 522, FIG. 5, is activated. The unfiltered signal is received at the input register 704. The input register sends the received signal to the DAP 708 (configured as a FIR filter by the micro sequencer). The received signal is processed by the FIR filter and routed to the output register 712.

The described architecture of the DCT/IDCT/FIR filter digital device allows parameterization of the design that offers a variety of throughput and cost savings using the same architecture. The following parameters can be used in alternate embodiments:

Number of bits of the input signal processed in parallel;

Pipelined register or shared register DAP for DCT/IDCT;

High or low frequency design; and

Number and combinations of FIR filter RAMs.

Given the regular structure of the architecture and the deterministic nature of the parameters a generator may be created that can take the parameters as an input and generate synthesizable DCT/IDCT/FIR filter. The generator creates programmable cost effective DCT/IDCT/FIR filter devices for applications ranging from low end video conferencing to high end high definition television decoders.

Figure 8:
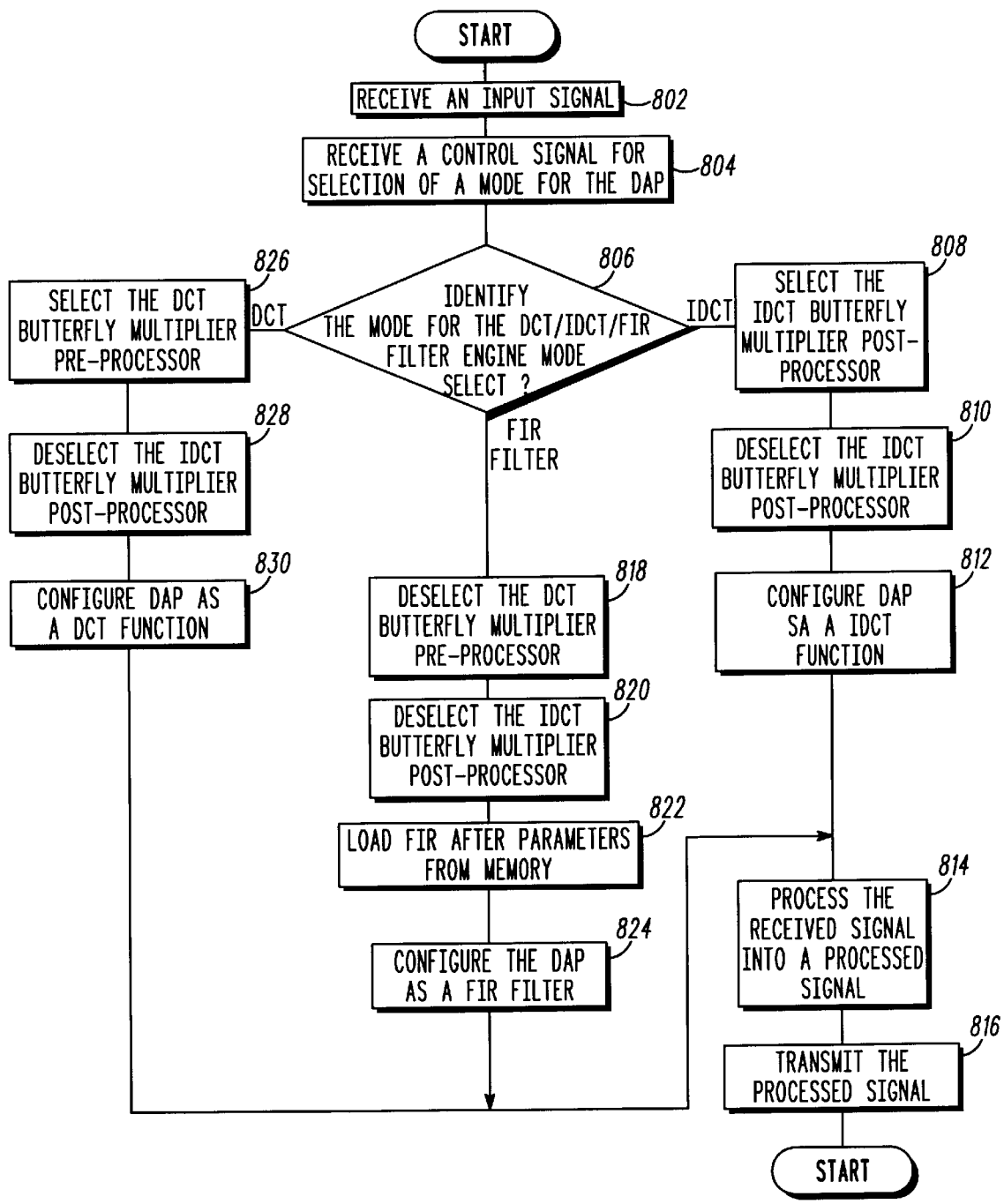
FIG. 8 is a flow diagram of the steps of a DCT/IDCT/FIR filter compressing and decompressing a signal via an DCT/IDCT/FIR filter engine in accordance with an embodiment of the invention.

Turning to FIG. 8, a flow diagram of the steps of a DCT/IDCT/FIR filter compressing and decompressing a signal via a DCT/IDCT/FIR filter engine is shown. An input signal is received at the input register 704, FIG. 7, of the DCT/IDCT/FIR filter engine in step 802, FIG. 8. A second signal (control signal) is received at the DCT/IDCT/FIR filter engine from a programmable microsequencer 702, FIG. 7 in step 804, FIG. 8.

In step 806, the DCT/IDCT/FIR filter engine 700, FIG. 7, identifies what mode is indicated by the control signal. If the control signal identifies the IDCT mode of operation, then the IDCT butterfly processor (post-processor) 710 is selected and coupled to the DAP 708, step 808, FIG. 8. The DCT butterfly processor (pre-processor) 706 is deselected in step 810, FIG. 8 and removed from the signal path of the input signal. The DAP 608 is configured as an IDCT function in response to the control signal in step 812, FIG. 8. The input signal is then processed by the DCT/IDCT/FIR 700, FIG. 7, operating in the IDCT mode, in step 814, FIG. 8, resulting in a processed signal. In step 816, the processed signal is transmitted from the DCT/IDCT/FIR 700, FIG. 7.

If in step 806 a control signal for configuring the DCT/IDCT/FIR 700, FIG. 7, to a FIR filter is identified from the programmable microsequencer 702, FIG. 7, then the DCT butterfly processor (pre-processor) 706 is deselected in step 818, FIG. 8 and removed from the path of the input signal. In step 820, the IDCT butterfly processor (post-process) 710, FIG. 7, is removed from the path of the signal. The FIR filter parameters used to configure the DAP 708 are loaded from memory in step 822, FIG. 8. The parameters are then used in step 824 to configure the DAP 708, FIG. 7, as a FIR filter. The input signal is then received by the DAP 708 and processed in step 814, FIG. 8. The processed signal is then transmitted from the DCT/IDCT/FIR filter engine in step 816.

If in step 806 a control signal for configuring the DCT/IDCT/FIR 700, FIG. 7, to a DCT mode is identified from the programmable microsequencer 702, FIG. 7, then the DCT butterfly processor (pre-processor) 706 is selected in step 826, FIG. 8 and is inserted in the path of the input signal. In step 828, the IDCT butterfly processor (post-processor) 710, FIG. 7, is deselected and removed from the path of the signal. The DAP is configured for a DCT function in step 830, FIG. 8, and the received signal is processed into a processed signal in step 814. The processed signal is then transmitted from the DCT/IDCT/FIR filter engine 700, FIG. 7, in step 816, FIG. 8.

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A method of compression and decompression of an input signal in a digital device comprising the steps of:

receiving the input signal and a control signal at a processor engine having a pre-processor, a post-processor, and a distributed arithmetic processor;

configuring the processor engine to function in a predetermined way in response to receipt of the control signal;

pre-processing the input signal to establish a pre-processed signal upon receipt of the input signal at the pre-processor;

processing the pre-processed signal with the distributed arithmetic processor upon receipt of the pre-processed signal to establish a processed signal;

post-processing the processed signal to establish a post-processed signal;

transmitting the post-processed signal from the processor engine; and wherein the step of configuring the processor engine further comprises the step of enabling the distributed arithmetic unit to selectively function in one of a DCT mode, an IDCT mode, and a FIR filter mode.

2. The method of claim 1 wherein the step of configuring further comprises the steps of coupling the pre-processor to the distributed arithmetic processor, selecting the distributed arithmetic processor to function in the DCT mode, and passing the processed signal through the past-processor without change resulting in the post-processor signal being the same as the processed signal.

3. The method of claim 1 wherein the step of configuring further comprises the steps of passing the input signal through the pre-processor without change resulting in the pre-processed signal being the same as the input signal, selecting the distributed arithmetic processor to function in the IDCT mode, and coupling an IDCT butterfly post-processor to the distributed arithmetic processor.

4. The method of claim 1 wherein the step of configuring further comprises the steps of setting the pie-processor to pass the input signal such that the pre-processed signal is the same as the input signal, selecting the distributed arithmetic processor to function in the FIR filter mode, and enabling the processed signal to pass through the IDCT butterfly post-processor such that the processed signal is the same as the post-processed signal.

5. The method of claim 1 wherein the step of configuring further comprises the step of storing a set of pre-computed coefficients in a dual port random access memory (RAM) for use by the process engine when in the FIR filter mode.

6. An apparatus for compressing a received signal comprising:

an input register for receipt of the received signal;

a distributed arithmetic processor coupled to the input register in which the distributed arithmetic processor has a plurality of operational modes and in which the distributed arithmetic processor processes the received signal resulting in a processed signal upon receipt of the received signal from the input register;

a DCT butterfly processor that selectively switches into an input path in response to the selection of a predetermined operation mode from the plurality of operational modes; and wherein the plurality of modes further comprise at least a DCT operational mode and a FIR filter operational mode.

7. The apparatus of claim 6 wherein the distributed arithmetic processor further comprises a memory.

8. The apparatus of claim 7 wherein the memory further comprises a dual port RAM memory.

9. The apparatus of claim 7 wherein the memory further comprises a dual port ROM memory.

10. An apparatus for decompressing a received signal comprising:

a distributed arithmetic processor having a plurality of operational modes;

an output register coupled to the distributed arithmetic processor for transmission of a processed signal via an output path in response to receiving the received signal;

an IDCT butterfly processor enabled to be selectively switched into the output path in response to selection of a predetermined operational mode from the plurality of operational modes; and wherein the plurality of operational modes further comprise at least an IDCT operational mode and a FIR filter operational mode.

11. The apparatus of claim 10 wherein the distributed arithmetic processor further comprises a memory.

12. The apparatus of claim 11 wherein the memory further comprises a dual port RAM memory.

13. The apparatus of claim 11 wherein the memory stores a set of FIR filter coefficients for use by the distributed arithmetic processor when in the FIR filter mode.

14. The apparatus of claim 11 wherein the memory further comprises a dual port ROM memory.

15. An apparatus for compression and decompression of a received signal comprising:

an input register which receives the received signal;

an output register which transmits a processed signal;

a distributed arithmetic processor having a plurality of operational modes in which the distributed arithmetic processor is coupled to the input register by an input path and is coupled to the output register by an output path;

a DCT butterfly processor selectively switched into the input path in response to selection of a predetermined operational mode from the plurality of operational modes;

an IDCT butterfly processor selectively switched into the output path in response to the selection of the predetermined operational mode from the plurality of operational modes; and wherein the plurality of modes further comprise at least a DCT operational mode, an IDCT operational mode, and a FIR filter operational mode.

16. The apparatus of claim 15 wherein the distributed arithmetic processor further comprises a memory.

17. The apparatus of claim 16 wherein the memory further comprises a dual port random access memory (RAM).

18. The apparatus of claim 16 wherein the memory stores a set FIR filter coefficients for use by the distributed arithmetic processor when in the FIR filter mode.

19. The apparatus of claim 16 werein the memory further comprises a dual port ROM memory.

* * * * *